US012307970B2

(12) United States Patent
Kim et al.

(10) Patent No.: US 12,307,970 B2
(45) Date of Patent: May 20, 2025

(54) DISPLAY DEVICE AND METHOD OF DRIVING SAME

(71) Applicant: LG Display Co., Ltd., Seoul (KR)

(72) Inventors: Moung O Kim, Paju-si (KR); Yu Sok Lim, Paju-si (KR); Min Woo Oh, Paju-si (KR); Hye Rin Kim, Paju-si (KR); Tae Hoon Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/537,008

(22) Filed: Dec. 12, 2023

(65) Prior Publication Data

US 2024/0257748 A1 Aug. 1, 2024

(30) Foreign Application Priority Data

Jan. 27, 2023 (KR) ........................ 10-2023-0011017

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2320/0233* (2013.01); *G09G 2320/0276* (2013.01); *G09G 2320/0285* (2013.01); *G09G 2320/043* (2013.01); *G09G 2360/16* (2013.01)

(58) Field of Classification Search
CPC ............... G09G 3/3233; G09G 3/3291; G09G 2320/0233; G09G 2320/0276; G09G 2320/0285; G09G 2320/043; G09G 2360/16; G09G 3/3275; G09G 5/10; G09G 2320/0257; G09G 2320/0673
See application file for complete search history.

(56) References Cited

U.S. PATENT DOCUMENTS

| | | | | |
|---|---|---|---|---|
| 2011/0216056 A1* | 9/2011 | Yoo | G09G 3/32 | 345/212 |
| 2016/0148559 A1* | 5/2016 | Kim | G09G 3/3208 | 345/76 |
| 2016/0379542 A1* | 12/2016 | Whangbo | G09G 3/2022 | 345/691 |
| 2021/0065606 A1* | 3/2021 | Park | G09G 3/2003 | |
| 2023/0030225 A1* | 2/2023 | Lee | G09G 3/3426 | |
| 2023/0230541 A1* | 7/2023 | Kim | G09G 3/3208 | 345/698 |
| 2023/0298502 A1* | 9/2023 | Lee | G09G 3/3233 | |

* cited by examiner

*Primary Examiner* — Hong Zhou
(74) *Attorney, Agent, or Firm* — Morgan, Lewis & Bockius LLP

(57) ABSTRACT

A display device according to an embodiment of the present disclosure includes a display panel including a plurality of pixels, a data driver configured to generate an image data voltage based on compensated image data generated by compensating for input image data and to apply the generated image data voltage to the display panel, and a deterioration compensation device configured to generate compensated image data by compensating for the input image data in response to an accumulated amount of deterioration data of the pixels and to apply the compensated image data to the data driver, wherein the deterioration compensation device compensates for the input image data on the basis of gamma values changed according to degrees of deterioration of the pixels.

10 Claims, 6 Drawing Sheets

FIG. 6

Red

| 8bit Gray | Deterioration time (Accumulated deterioration data) | | | | |
|---|---|---|---|---|---|
| | 0hr | 300hr | 900hr | 1200hr | 1500hr |
| 31 | 3.20 | 3.37 | 3.26 | 3.32 | 3.28 |
| 47 | 2.26 | 2.38 | 2.34 | 2.37 | 2.34 |
| 63 | 2.68 | 2.79 | 2.78 | 2.80 | 2.77 |
| 79 | 2.79 | 2.74 | 2.77 | 2.78 | 2.74 |
| 95 | 2.47 | 2.60 | 2.57 | 2.60 | 2.58 |
| 111 | 2.66 | 2.74 | 2.72 | 2.74 | 2.73 |
| 127 | 2.49 | 2.55 | 2.54 | 2.54 | 2.52 |
| 143 | 2.53 | 2.61 | 2.59 | 2.61 | 2.59 |
| 159 | 2.61 | 2.62 | 2.64 | 2.64 | 2.62 |
| 175 | 2.51 | 2.58 | 2.58 | 2.60 | 2.58 |
| 191 | 2.54 | 2.60 | 2.60 | 2.61 | 2.60 |
| 207 | 2.56 | 2.63 | 2.61 | 2.62 | 2.61 |
| 223 | 2.48 | 2.63 | 2.61 | 2.61 | 2.61 |
| 239 | 2.50 | 2.62 | 2.60 | 2.61 | 2.60 |
| 255 | 2.54 | 2.64 | 2.63 | 2.64 | 2.63 |

Green

| 8bit Gray | Deterioration time (Accumulated deterioration data) | | | | |
|---|---|---|---|---|---|
| | 0hr | 300hr | 900hr | 1200hr | 1500hr |
| 31 | 3.20 | 3.53 | 3.52 | 3.58 | 3.54 |
| 47 | 2.26 | 2.48 | 2.47 | 2.49 | 2.52 |
| 63 | 2.68 | 2.85 | 2.86 | 2.88 | 2.90 |
| 79 | 2.66 | 2.71 | 2.74 | 2.76 | 2.74 |
| 95 | 2.53 | 2.63 | 2.65 | 2.66 | 2.67 |
| 111 | 2.69 | 2.76 | 2.78 | 2.79 | 2.79 |
| 127 | 2.50 | 2.58 | 2.59 | 2.59 | 2.60 |
| 143 | 2.57 | 2.64 | 2.65 | 2.66 | 2.67 |
| 159 | 2.62 | 2.64 | 2.68 | 2.69 | 2.67 |
| 175 | 2.49 | 2.61 | 2.61 | 2.64 | 2.63 |
| 191 | 2.53 | 2.63 | 2.63 | 2.66 | 2.65 |
| 207 | 2.54 | 2.64 | 2.65 | 2.65 | 2.64 |
| 223 | 2.54 | 2.62 | 2.64 | 2.62 | 2.64 |
| 239 | 2.55 | 2.61 | 2.63 | 2.63 | 2.63 |
| 255 | 2.57 | 2.66 | 2.67 | 2.67 | 2.67 |

Blue

| 8bit Gray | Deterioration time (Accumulated deterioration data) | | | | |
|---|---|---|---|---|---|
| | 0hr | 300hr | 900hr | 1200hr | 1500hr |
| 31 | 3.24 | 3.76 | 3.89 | 4.04 | 4.02 |
| 47 | 2.38 | 2.71 | 2.86 | 2.93 | 3.03 |
| 63 | 2.75 | 3.03 | 2.98 | 3.10 | 3.11 |
| 79 | 2.72 | 2.66 | 2.78 | 2.77 | 2.80 |
| 95 | 2.49 | 2.61 | 2.65 | 2.66 | 2.66 |
| 111 | 2.61 | 2.66 | 2.71 | 2.72 | 2.72 |
| 127 | 2.53 | 2.60 | 2.59 | 2.59 | 2.60 |
| 143 | 2.53 | 2.63 | 2.62 | 2.63 | 2.63 |
| 159 | 2.57 | 2.64 | 2.64 | 2.64 | 2.63 |
| 175 | 2.50 | 2.60 | 2.60 | 2.61 | 2.60 |
| 191 | 2.51 | 2.61 | 2.60 | 2.59 | 2.60 |
| 207 | 2.54 | 2.60 | 2.60 | 2.61 | 2.60 |
| 223 | 2.54 | 2.61 | 2.61 | 2.61 | 2.60 |
| 239 | 2.52 | 2.57 | 2.58 | 2.59 | 2.58 |
| 255 | 2.54 | 2.75 | 2.67 | 2.69 | 2.68 |

FIG. 7

| Luminance Gain (Tap & Lgain) | | Data Gain |
|---|---|---|
| 0 | 128 | 191 |
| 1 | 256 | 361 |
| 2 | 384 | 514 |
| 3 | 512 | 654 |
| 4 | 640 | 785 |
| 5 | 768 | 907 |
| 6 | 896 | 1021 |
| 7 | 1024 | 1130 |
| Gamma | | **2.5** |
| Gray level | | 255~0 G |
| Pre-DAC | | 1023~63 |

| Luminance Gain (Tap & Lgain) | | Data Gain | | | | | | | |
|---|---|---|---|---|---|---|---|---|---|
| 0 | 128 | 191 | 187 | 184 | 180 | 176 | 173 | 170 | - |
| 1 | 256 | 361 | 353 | 346 | 339 | 332 | 352 | 319 | - |
| 2 | 384 | 514 | 503 | 492 | 482 | 472 | 462 | 453 | - |
| 3 | 512 | 654 | 640 | 626 | 612 | 599 | 587 | 575 | - |
| 4 | 640 | 785 | 767 | 750 | 733 | 717 | 702 | 688 | - |
| 5 | 768 | 907 | 885 | 865 | 846 | 828 | 810 | 793 | - |
| 6 | 896 | 1021 | 997 | 974 | 952 | 931 | 911 | 891 | - |
| 7 | 1024 | 1130 | 1103 | 1077 | 1052 | 1028 | 1006 | 984 | - |
| Gamma | | **2.5** | **2.55** | **2.6** | **2.65** | **2.7** | **2.75** | **2.8** | Black |
| Gray level | | 255~0 G | - | - | 127G | - | 47G | - | - |
| Pre-DAC | | 1023~63 | 767~ | 639~ | 511~ | 383~ | 255~ | 127~ | 63 |

DISPLAY DEVICE AND METHOD OF DRIVING SAME

This application claims the benefit of Korean Patent Application No. 10-2023-0011017, filed on Jan. 27, 2023, which is hereby incorporated by reference as if fully set forth herein.

BACKGROUND

Technical Field

The present disclosure relates to a display device and a method of driving the same.

Discussion of the Related Art

Among display devices used for computer monitors, TVs, and mobile phones, organic light emitting displays (OLEDs) are attracting attention as a next-generation device due to the advantages of a wide viewing angle, excellent contrast, and a high response speed.

Organic light emitting displays have pixels including OLEDs and driving thin film transistors (TFTs) disposed in a matrix form and can display an image by adjusting the luminance of an input image implemented by the pixels according to gray levels of image data.

OLEDs deteriorate as the driving time elapses and thus the threshold voltage, luminous efficacy, and the like thereof may change. Such deterioration of OLEDs may cause after-images and non-uniform luminance, thereby reducing the lifespan of the display device. Accordingly, technology for compensating for image data in response to a degree of deterioration of OLEDs is employed, and research to improve compensation performance is being conducted.

SUMMARY

Accordingly, embodiments of the present disclosure are directed to a display device and a method of driving the same that substantially obviate one or more of the problems due to limitations and disadvantages of the related art.

An aspect of the present disclosure is to provide a display device capable of improving the accuracy of compensation data for compensating for deterioration of light emitting elements and a method of driving the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel including a plurality of pixels, a data driver configured to generate an image data voltage based on compensated image data generated by compensating for input image data and to apply the generated image data voltage to the display panel, and a deterioration compensation device configured to generate compensated image data by compensating for the input image data in response to an accumulated amount of deterioration data of the pixels and to apply the compensated image data to the data driver, wherein the deterioration compensation device compensates for the input image data on the basis of gamma values changed according to degrees of deterioration of the pixels.

The deterioration compensation device may be configured to compensate for the input image data on the basis of a gamma value set according to at least one of a color, an accumulated driving time, and a gray level of each pixel.

The accumulated amount of deterioration data of the pixels may include values obtained by accumulating deterioration data of light emitting elements included in the pixels.

The deterioration compensation device may include a luminance compensation amount calculator configured to calculate a luminance compensation amount of the input image data on the basis of the accumulated amount of deterioration data, a gamma correction LUT in which gamma values changed according to degrees of deterioration of the pixels are stored, a data compensation gain calculator configured to calculate a data compensation gain according to the luminance compensation amount calculated by the luminance compensation amount calculator by reflecting gamma values set according to degrees of deterioration of the pixels in a preset relational expression representing a relationship between a luminance compensation gain and a data compensation gain, and a data compensator configured to generate the compensated image data by applying the calculated data compensation gain to the input image data.

The gamma change LUT may store a gamma value set for each color, each gray level, and each accumulated driving time of each of the pixels.

The data compensation gain calculator may be configured to calculate a luminance gain on the basis of the luminance compensation amount calculated by the luminance compensation amount calculator and to calculate the data compensation gain by applying the calculated luminance gain to the following relational expression $$\text{Data gain}\,(Pre\text{-}DAC\ \text{Gain}) = (\text{luminance gain}\,(Lgain))^{\frac{1}{gamma\ value}} \quad \langle\text{Relational expression}\rangle$$

wherein the gamma value is a variable set according to a degree of deterioration of each pixel.

The data driver may be configured to generate the image data voltage by applying a gamma value set in a preset gamma set to the compensated image data.

In another aspect, a method of driving a display device including a display panel having a plurality of pixels and a data driver configured to generate an image data voltage based on compensated image data generated by compensating for input image data and applying the generated image data voltage to the display panel comprises calculating a luminance compensation amount of the input image data according to an accumulated amount of deterioration data of the pixels, calculating a data compensation gain according to the luminance compensation amount calculated in the calculating of a luminance compensation amount by reflecting gamma values set according to degrees of deterioration of the pixels in a preset relational expression representing a relationship between a luminance compensation gain and a data compensation gain, and generating the compensated image data by applying the calculated data compensation gain to the input image data.

The gamma values set according to the degrees of deterioration of the pixels may include a gamma value set for each color, each gray level, and each accumulated driving time of each pixel.

The preset relation expression representing a relationship between a luminance compensation gain and a data compensation gain may include the following relational expression $$\text{Data gain}\left(Pre\text{-}DAC\ \text{Gain}\right) = (\text{luminance gain}\,(Lgain))^{\frac{1}{gamma\ value}} \quad \langle\text{Relational expression}\rangle$$

wherein the gamma value is a variable set according to a degree of deterioration of each pixel.

The accumulated amount of deterioration data of the pixels may include values obtained by accumulating deterioration data of light emitting elements included in the pixels.

The method may further include receiving, by the data driver, the compensated image data, generating, by the data driver, the image data voltage by applying a gamma value set in a preset gamma set to the compensated image data, and applying, by the data driver, the image data voltage to the display panel.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 6 is a diagram showing an example of data stored in gamma correction LUTs according to an embodiment of the present disclosure; and FIG. 7 is tables showing comparison between data compensation results according to a comparative example and an embodiment.

DETAILED DESCRIPTION

Figure 1:
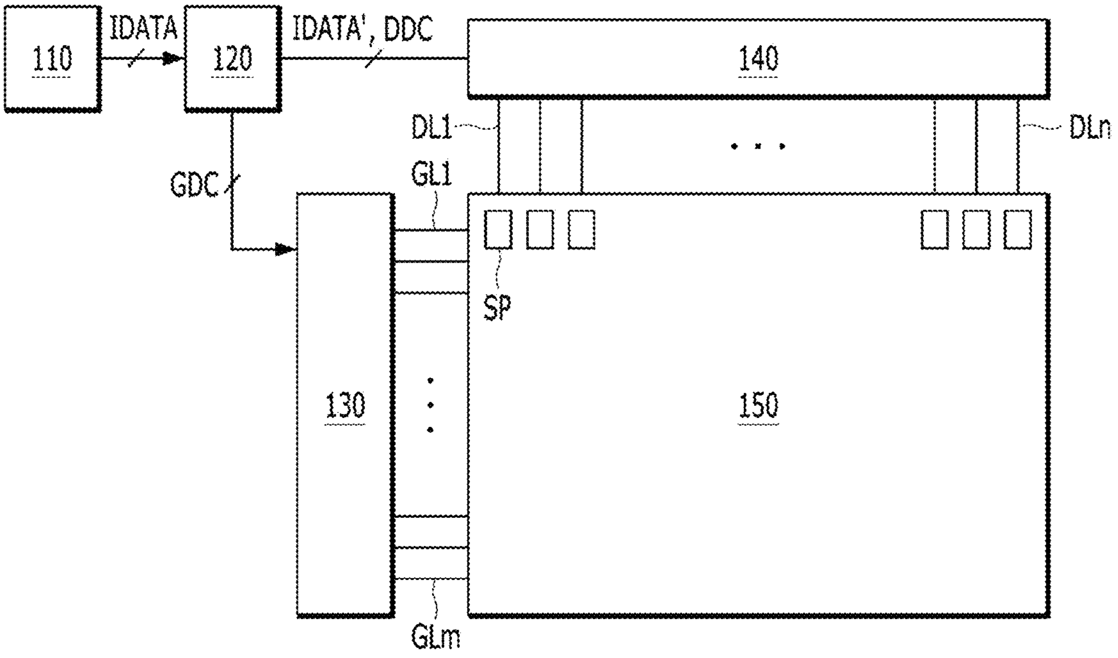
FIG. 1 is a diagram showing a display device according to an embodiment of the present disclosure.

The advantages, features and methods for accomplishing the same of the present disclosure will become more apparent through the following detailed description with respect to the accompanying drawings. However, the present disclosure is not limited by embodiments described below and is implemented in various different forms, and the embodiments are provided so that this disclosure will be thorough and complete, and will fully convey the scope of the invention to those skilled in the art. The present invention is defined by the scope of the claims.

Shapes, sizes, ratios, angles, numbers, etc. shown in the figures to describe embodiments of the present disclosure are exemplary and thus are not limited to particulars shown in the figures. Like numbers refer to like elements throughout the specification. It will be further understood that, when the terms "include," "have" and "comprise" are used in the present disclosure, other parts may be added unless "~ only" is used. An element described in the singular form is intended to include a plurality of elements unless context clearly indicates otherwise.

In interpretation of a component, the component is interpreted as including an error range unless otherwise explicitly described.

It will be understood that, when an element is referred to as being "on," "above," "under" or "by" another element, it can be "directly" on or under another element or can be "indirectly" formed such that an intervening element is also present.

In the following description of the embodiments, "first" and "second" are used to describe various components, but such components are not limited by these terms. The terms are used to discriminate one component from another component. Accordingly, a first component mentioned in the following description may be a second component within the technical spirit of the present disclosure.

Each of pixels of an electroluminescent display device includes a light emitting element and a driving element that drives the light emitting element by generating a pixel current according to a gate-source voltage. The light emitting element includes an anode, a cathode, and an organic compound layer formed between the anode and the cathode. The organic compound layer includes a hole injection layer (HIL), a hole transport layer (HTL), an emission layer (EML), an electron transport layer (ETL), an electron injection layer (EIL), and the like, but is not limited thereto. When the pixel current flows through the light emitting element, holes that have passed through the hole transport layer (HTL) and electrons that have passed through the electron transport layer (ETL) move to the light emitting layer (EML) to generate excitons, and as a result, the light emitting layer (EML) can emit visible light.

A display device according to the present disclosure may be realized by a television system, a video player, a personal computer (PC), a home theater, a vehicle electric apparatus, and a smartphone, but the present disclosure is not limited thereto. The display device according to the present disclosure may be realized by a light emitting display device (LED), a quantum dot display device (QDD), a liquid crystal display device (LCD), or the like. However, a light emitting display device that directly emits light based on inorganic light emitting diodes or organic light emitting diodes will be described as an example for convenience of description.

Like numbers refer to like elements throughout the specification. Hereinafter, embodiments of the present disclosure will be described in detail with reference to the attached drawings. In the following description, if a detailed description of known techniques associated with the present disclosure would unnecessarily obscure the gist of the present disclosure, detailed description thereof will be omitted.

Figure 2:
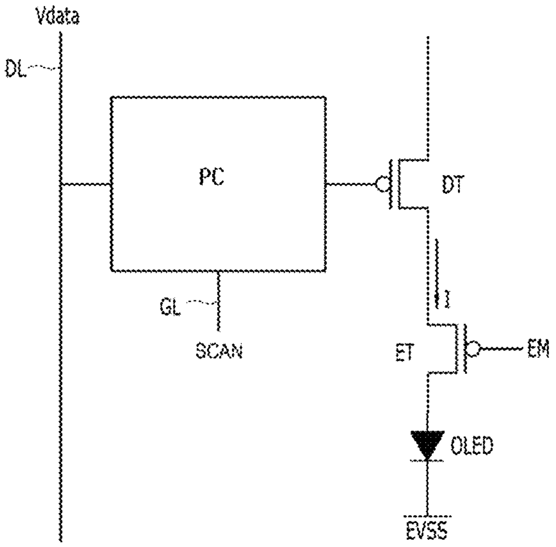
FIG. 2 is a diagram showing an embodiment of one pixel included in a display panel.

FIG. 1 is a diagram showing a display device according to an embodiment of the present disclosure and FIG. 2 is a diagram showing an example of one pixel included in a display panel.

Referring to FIGS. 1 and 2, the display device may include an image provider 110, a timing controller 120, a scan driver 130, a data driver 140, and a display panel 150.

The image provider 110 may supply a data signal IDATA to be displayed on the display panel 150 and various driving signals to the timing controller 120. The image provider 110 may output an externally supplied image data signal or an image data signal stored in an internal memory as a data signal IDATA.

The display panel 150 displays an image according to driving signals including a scan signal and a data voltage. The display panel 150 may include a plurality of sub-pixels SP disposed at intersections of a plurality of gate lines GL1 to GLm and a plurality of data lines DL1 to DLn in a matrix form. For example, one sub-pixel SP may include a pixel circuit PC, a driving TFT DT, a light emitting TFT ET, and an OLED. The pixel circuit PC may transmit a data signal Vdata supplied from the data line DL to the driving TFT DT in response to a scan signal SCAN supplied from the gate line GL. The pixel circuit PC may be configured in various structures to transfer the data signal Vdata to the driving TFT DT. The driving TFT DT can adjust the current I flowing through the OLED on the basis of the data signal Vdata transmitted from the pixel circuit PC. Here, the luminance of the OLED may be adjusted according to the magnitude of the current I. The light emitting TFT ET is turned on by an emission signal EM supplied from the gate line GL and supplies the current I flowing through the driving TFT DT to the OLED.

The timing controller 120 may generate a gate timing control signal GDC for controlling the operation timing of the scan driver 130, a data timing control signal DDC for controlling the operation timing of the data driver 140, various synchronization signals (a vertical synchronization signal Vsync and a horizontal synchronization signal Hsync), and the like on the basis of various driving signals input from the image provider 110 and output the signals.

The timing controller 120 may provide the data signal IDATA supplied from the image provider 110 to the data driver 140 along with the data timing control signal DDC. Here, the timing controller 120 may supply, to the data driver 140, a deterioration-compensated data signal IDATA' obtained by reflecting compensation data calculated depending on the accumulated amount of deterioration of OLEDs in the data signal IDATA. The deterioration compensation function of the timing controller 120 will be described later in detail.

The data driver 140 may sample and latch the deterioration-compensated data signal IDATA' in response to the data timing control signal DDC supplied from the timing controller 120, convert the data signal in a digital form into an analog data voltage VDATA on the basis of a gamma reference voltage, and output the analog data voltage VDATA. Here, the gamma reference voltage may be set according to a pre-stored gamma set depending on the luminance, gray level, and the like of the input data signal IDATA'. The data driver 140 may supply the data voltage VDATA to the sub-pixels SP included in the display panel 150 through the data lines DL1 to DLn. The data driver 140 may be implemented in the form of an IC and mounted on the display panel 150 or mounted on a printed circuit board, but is not limited thereto.

The scan driver 130 may output a scan signal and an emission signal in response to the gate timing control signal (GDC) supplied from the timing controller 120. The scan driver 130 may supply at least one scan signal and an emission signal to the sub-pixels SP included in the display panel 150 through the gate lines GL1 to GLm. The scan driver 130 may be implemented in the form of an IC or directly formed on the display panel 150 in a gate-in-panel structure.

Meanwhile, in the display device 100, OLEDs may deteriorate as the driving time of each pixel SP increases. When an OLED deteriorates, the threshold voltage that can turn on the OLED increases and the luminous efficacy decreases. Since the cumulative emission time of the OLED may be different for each pixel, OLED deterioration may also be different for each pixel. A difference in OLED deterioration between pixels may cause a luminance deviation, and furthermore, cause image sticking.

Figure 3:
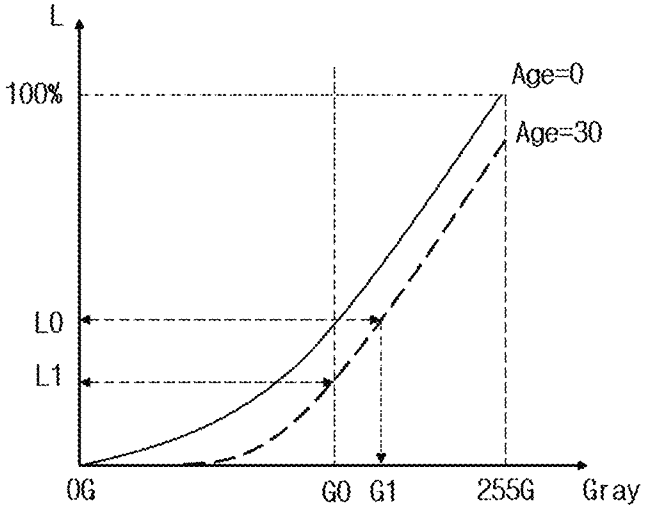
FIGS. 3 and 4 are diagrams showing deterioration characteristics of OLEDs.
Figure 4:
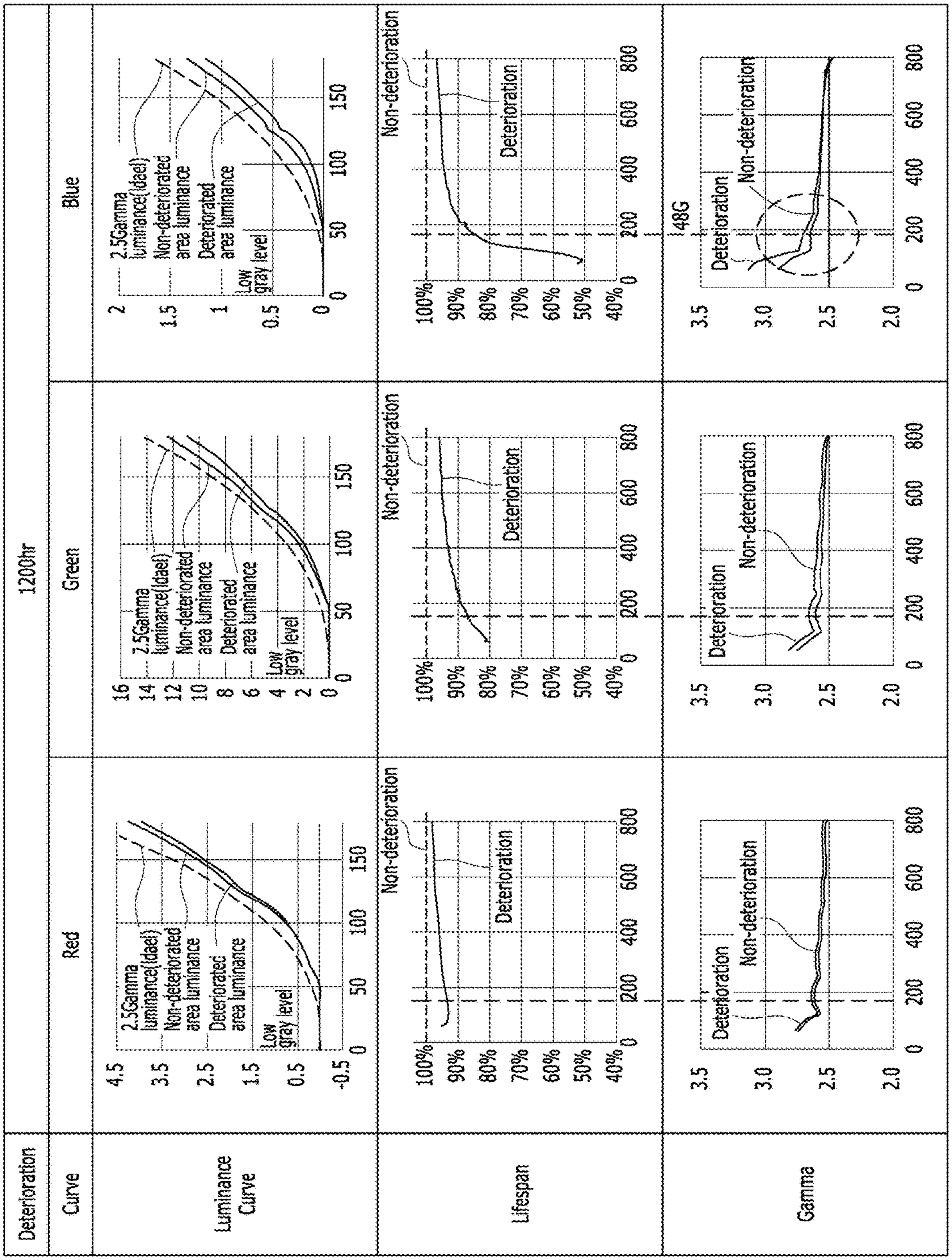

FIGS. 3 and 4 are diagrams showing deterioration characteristics of OLEDs.

FIG. 3 shows a relationship between a gray level and luminance according to deterioration or accumulation of lifespan. As shown in FIG. 3, at the initial stage (i.e., Age=0), when a gray level IGRAY1 corresponding to a first gray level G0 is input, a pixel emits light with a first luminance L0 corresponding thereto. When pixel deterioration progresses (for example, the graph shifts from Age=0 to Age=30), the display luminance may drop to a second luminance L1 due to input of the first gray level G0. Accordingly, in order to emit light with the first luminance L1, a deterioration compensation device 200 may compensate for the input gray level to the second gray level G1.

Such a degree of deterioration is measured differently depending on the color, driving time, and gray level of an OLED.

FIG. 4 shows results of testing deterioration characteristics according to colors, driving times, and gray levels of OLEDs, and shows results of tests of luminances, lifespans, and gamma characteristics of red, green and blue OLEDS for each gray level based on driving for 1200 hours (1200 hr).

Referring to luminance curves, it can be ascertained that luminances of deteriorated areas are lowered compared to luminances of non-deteriorated areas for the OLEDs of all colors. The luminance curves of FIG. 4 show luminance differences in a low gray-level area having particularly considerable luminance change. 2.5 gamma luminance is an ideal luminance that is expected to be reproduced when a commonly used gamma value of 2.5 is applied to gray-level values, and it can be ascertained that differences from the 2.5 gamma luminance are greater in deteriorated areas. In addition, it can be ascertained that the degree of deterioration is different for each color and each gray level.

Referring to lifespan curves, it can be ascertained that deterioration occurs in the OLEDs of all colors, but the degree of deterioration is different for each color and each gray level. In particular, in the case of the blue OLED, it can be ascertained that the degree of deterioration is high in a low gray-level area of 48 Gray or less.

Gamma curves are graphs showing gamma values derived from a relation expression representing a relationship between a luminance compensation gain (L gain) and a data gain (Pre-DAC gain). A gray-level value Gray is converted into a digital data signal DATA and provided to the data driver 140. Accordingly, the data driver 140 applies a set gamma value to the input gray-level value Gray to obtain the digital data signal DATA, converts the digital data signal DATA into an analog data voltage, and then outputs the analog data voltage. The relationship between a luminance compensation gain (L gain) and a data compensation gain (D gain) applied to a conventional display device as a comparative example can be represented by the following <Relational expression 1>.

$$\text{Data gain}\,(Pre\text{-}DAC\ \text{Gain}) = (\text{luminance gain}\,(Lgain))^{\frac{1}{2.5}} \quad \langle\text{Relational expression}\rangle$$

In <Relational expression 1> according to the comparative example, 2.5 of the exponent means a gamma value that is normally applied. In <Relational expression 1> according to the comparative example, which is a conventional technology, the gamma value is fixed to 2.5 and applied. Accordingly, it is confirmed that the gamma value is overcompensated by 2.5 or more in actually measured data because differences in deterioration for each gray level and each color of the actual display device cannot be reflected.

Through the above tests, it can be ascertained that OLEDs have different degrees of deterioration by color, gray level, and driving time, and when a fixed gamma value (2.5) is applied to the relational expression showing the relationship between the luminance compensation gain (L gain) and the data compensation gain (D gain), actually measured data cannot reflect differences in degrees of deterioration.

Therefore, the deterioration compensation device according to the embodiment of the present disclosure can convert a luminance compensation gain (L gain) into a data compensation gain (D gain) by applying a gamma value that matches each color, gray level, and driving time, and apply a data compensation gain (D gain) calculated using a changed gamma value to input image data, to thereby compensate for deterioration.

Figure 5:
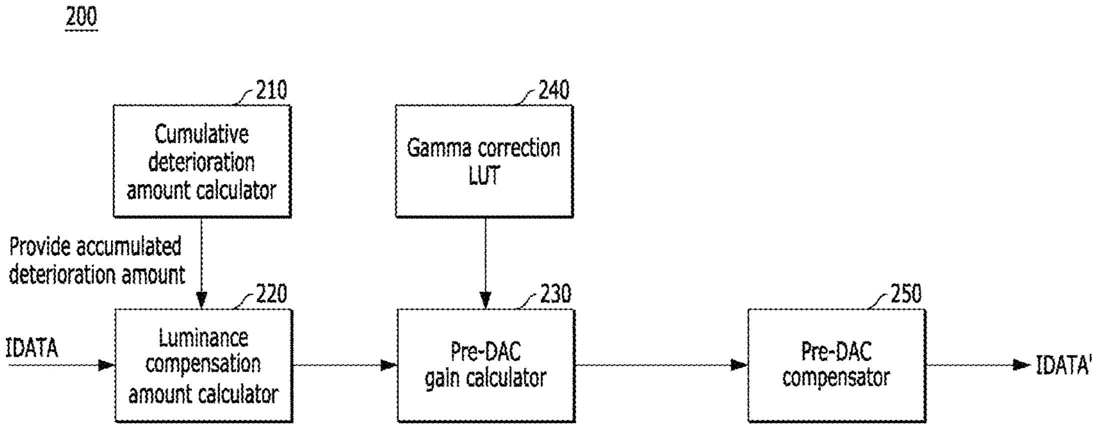
FIG. 5 is a diagram showing an example of a configuration of a deterioration compensation device according to an embodiment of the present disclosure.

FIG. 5 is a diagram showing an example of a configuration of a deterioration compensation device 200 according to an embodiment of the present disclosure.

Referring to FIG. 5, the deterioration compensation device 200 according to an embodiment of the present disclosure may include a cumulative deterioration amount calculator 210, a luminance compensation amount calculator 220, a Pre-DAC gain calculator 230, a gamma correction LUT 240, and a Pre-DAC compensator 250.

The cumulative deterioration amount calculator 210 may calculate a cumulative deterioration amount by calculating a luminance compensation amount or by sensing the amount of change in the threshold voltage Vth of the OLEDs from the display panel 150.

The luminance compensation amount calculator 220 receives cumulative deterioration amount information from the cumulative deterioration amount calculator 210 and may calculate a luminance amount required to compensate for a reduced luminance due to deterioration as a luminance compensation amount. When OLEDs are in a deteriorated state, if input data IDATA is displayed as it is, the luminance may be reduced by the amount of deterioration of the OLEDs and reproduced. Therefore, the luminance compensation amount calculator 220 calculates a luminance compensation amount required to reproduce the input data IDATA with a desired luminance.

The Pre-DAC gain calculator 230 may calculate a compensation amount of data Vdata to be actually used in order to realize the calculated luminance compensation amount. Since the data Vdata for realizing the luminance is represented as Pre-DAC, the Pre-DAC gain calculator 230 needs to convert the luminance compensation gain (L gain) into a data gain (Pre-DAC gain) for compensating for a digital data signal DATA. The Pre-DAC gain calculator 230 converts the luminance compensation gain (L gain) into the data compensation gain (Pre-DAC gain) using the following <Relational expression 2>.

In <Relational expression 2>, the "gamma value" is a variable set according to the color, gray level, and driving time of each OLED. As compared to the case where the pre-DAC gain is calculated by fixing the gamma value to 2.5 in the display device of the comparative example, the "gamma value" is changed according to the color, gray level, and driving time of the OLED and applied in the embodiment of the present disclosure. The gamma value may be changed according to the color, gray level, and driving time may be obtained according to characteristics of each display panel and stored in the gamma correction LUT 240. LUTs stored in the gamma correction LUT 240 will be described later in detail.

The Pre-DAC compensator 250 multiplies the input data IDATA by the Pre-DAC gain calculated by the Pre-DAC gain calculator 230 to generate a deterioration-compensated data IDATA'.

Thereafter, the deterioration-compensated data IDATA' may be provided to the data driver 140, converted into an analog data voltage VDATA on the basis of a gamma reference voltage according to a preset gamma set, and then output.

FIG. 6 is a diagram illustrating data stored in gamma correction LUTs according to an embodiment of the present disclosure.

Referring to FIG. 6, gamma correction LUTs may be stored for each color of red, green, and blue. In the LUT for each color, a gamma value for each gray level and each deterioration time may be stored. FIG. 6 illustrates gamma values in an 8-bit grayscale in the gamma correction LUTs, but the present disclosure is not limited thereto.

According to the embodiment of the present disclosure, the gamma correction LUTs illustrated in FIG. 6 may be stored in the gamma correction LUT 240.

Accordingly, when the Pre-DAC gain calculator 230 may calculate the data compensation amount required to realize the calculated luminance compensation amount, the Pre-DAC gain calculator 230 may apply gamma values stored in the gamma correction LUT to <Relational expression 2> described above to calculate the data compensation amount.

For example, when a gray level of 63 Gray is represented using a red OLED having a deterioration time of 1200 hr, a gamma value of "2.80" may be extracted from the gamma correction LUT. According to <Relation expression 2>, the Pre-DAC gain calculator 230 may apply the gamma value of "2.80" extracted from the gamma correction LUT to the gamma value of the luminance compensation gain (L gain) calculated by the luminance compensation amount calculator 220 to calculate a data compensation gain (Pre-DAC gain).

When gamma values according to gray levels or deterioration times are not stored, a closest gamma value among stored values may be selected, or a required gamma value may be calculated through interpolation. For example, if a gamma value when a green OLED is driven at 47 Gray for 600 hours is required, an intermediate value of a gamma value of 2.48 in case of driving for 300 hours and a gamma value of 2.47 in case of driving for 900 hours can be calculated and applied.

As described above, when the Pre-DAC gain is calculated after a gamma value is selected according to the gamma correction LUT and the gamma value of the <Relational expression> is set, the data IDATA' compensated by completely reflecting degrees of deterioration according to the colors, gray levels, and deterioration time of the OLEDs may be generated.

FIG. 7 is tables showing comparison between data compensation results according to a comparative example (a) and an embodiment (b). The comparative example (a) shows results obtained by calculating a data gain Pre-DAC by applying a fixed gamma value of 2.5 and calculating a compensated data IDATA' according to the data gain Pre-DAC, and the embodiment (b) shows results obtained by calculating a data gain Pre-DAC by applying a gamma value that changes according to the driving time and gray level of an OLED and calculating a compensated data IDATA' according to the data gain Pre-DAC.

According to the table showing the comparative example (a), the gamma value is fixed to 2.5 for luminance gains Lgain, and thus a fixed data gain (Dgain) is applied according to each luminance gain Lgain.

According to the table showing the embodiment (b), when a luminance gain Lgain is converted into a data gain Dgain, various gamma values such as 2.5, 2.55, 2.6, and 2.7 can be applied for respective gray levels and driving times according to a preset LUT, for example, the gamma correction LUT of FIG. 6.

Therefore, even if the same luminance gain Lgain is converted, various data gains Dgain can be applied according to a set gamma value. Here, since the gamma value is changed according to the characteristics of each display panel according to the driving time (the driving time of OLEDs and a degree of luminance deterioration according to gray level), compensated data matching change in the luminance characteristics of the display panel can be generated.

The deterioration compensation device 200 having the above-described configuration may be included in the timing controller 120 in the form of a memory in which an algorithm for processing a series of functions performed by the deterioration compensation device 200 and gamma correction LUTs are stored. In addition, the deterioration compensation device 200 may be included in the data driver 140, implemented in the form of a chipset that performs deterioration compensation, or implemented as a separate application processor (AP).

The display device and the method of driving the same according to the present embodiment can improve the accuracy of compensation at the time of compensating for deterioration of light emitting elements.

The display device and the method of driving the same according to the present embodiment can store in advance luminance change characteristics according to deterioration time, colors, and gray levels of light emitting elements of a display panel and generate compensation data matching a degree of actual deterioration of the display device at the time of generating compensation data depending on the cumulative usage of light emitting elements, thereby improving compensation accuracy.

Effects according to the present disclosure are not limited by the above description, and various effects are included in the present disclosure.

It will be apparent to those skilled in the art that various modifications and variations can be made in the display device and the method of driving the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a display panel including a plurality of pixels;

a data driver configured to generate an image data voltage based on compensated image data generated by compensating for input image data and to apply the generated image data voltage to the display panel; and a deterioration compensation device configured to generate compensated image data by compensating for the input image data in response to an accumulated amount of deterioration data of the pixels and to apply the compensated image data to the data driver, wherein the deterioration compensation device comprises: a gamma correction LUT configured to store a gamma value set for each color, each gray level, and each accumulated driving time of each of the pixels, the gamma value set storing gamma values changed according to degrees of deterioration of the pixels, and wherein the deterioration compensation device is configured to compensate for the input image data based on the gamma values stored in the gamma correction LUT.

2. The display device of claim 1, wherein the deterioration compensation device is configured to compensate for the input image data on the basis of the gamma value set stored in the gamma correction LUT.

3. The display device of claim 1, wherein the accumulated amount of deterioration data of the pixels includes values obtained by accumulating deterioration data of light emitting elements included in the pixels.

4. The display device of claim 1, wherein the deterioration compensation device further comprises:

a luminance compensation amount calculator configured to calculate a luminance compensation amount of the input image data on the basis of the accumulated amount of deterioration data;

a data compensation gain calculator configured to calculate a data compensation gain according to the luminance compensation amount calculated by the luminance compensation amount calculator by reflecting the gamma value set according to the degrees of deterioration of the pixels in a preset relational expression representing a relationship between a luminance compensation gain and a data compensation gain; and a data compensator configured to generate the compensated image data by applying the calculated data compensation gain to the input image data.

5. The display device of claim 4, wherein the data compensation gain calculator is configured to calculate a luminance gain on the basis of the luminance compensation amount calculated by the luminance compensation amount calculator and to calculate the data compensation gain by applying the calculated luminance gain to the following relational expression ⟨Relational expression⟩

$$\text{Data gain}(Pre\text{-}DAC\ \text{Gain}) = (\text{luminance gain}(Lgain))^{\frac{1}{\text{gamma value}}}$$

wherein the gamma value is a variable set according to a degree of deterioration of each pixel.

6. The display device of claim 1, wherein the data driver is configured to generate the image data voltage by applying a gamma value set in a preset gamma set to the compensated image data.

7. A method of driving a display device including a display panel having a plurality of pixels and a data driver configured to generate an image data voltage based on compensated image data generated by compensating for input image data and applying the generated image data voltage to the display panel, the method comprising:

calculating a luminance compensation amount of the input image data according to an accumulated amount of deterioration data of the pixels;

calculating a data compensation gain according to the luminance compensation amount calculated in the calculating of a luminance compensation amount by reflecting a gamma value set according to degrees of deterioration of the pixels in a preset relational expression representing a relationship between a luminance compensation gain and a data compensation gain; and generating the compensated image data by applying the calculated data compensation gain to the input image data, wherein the gamma value set for each color, each gray level, and each accumulated driving time of each of the pixels is stored in a gamma correction LUT in which gamma values changed according to the degrees of deterioration of the pixels are stored.

8. The method of claim 7, wherein the preset relation expression representing a relationship between a luminance compensation gain and a data compensation gain includes the following relational expression ⟨Relational expression⟩

$$\text{Data gain}(Pre\text{-}DAC\ \text{Gain}) = (\text{luminance gain}(Lgain))^{\frac{1}{gamma\ value}}$$

wherein the gamma value is a variable set according to a degree of deterioration of each pixel.

9. The method of claim 7, wherein the accumulated amount of deterioration data of the pixels includes values obtained by accumulating deterioration data of light emitting elements included in the pixels.

10. The method of claim 7, further comprising:

receiving, by the data driver, the compensated image data;

generating, by the data driver, the image data voltage by applying a gamma value set in a preset gamma set to the compensated image data; and applying, by the data driver, the image data voltage to the display panel.

* * * * *